United States Patent
Watanabe et al.

(10) Patent No.: US 11,862,978 B2
(45) Date of Patent: Jan. 2, 2024

(54) POWER SUPPLY SYSTEM, CONTROL SYSTEM AND POWER CONTROL METHOD FOR POWER SUPPLY SYSTEM

(71) Applicants: SANYO Electric Co., Ltd., Daito (JP); Panasonic Corporation, Kadoma (JP)

(72) Inventors: Tohru Watanabe, Nara (JP); Takashi Iida, Hyogo (JP); Shinya Nishikawa, Osaka (JP); Kazufumi Nishikawa, Osaka (JP); Shigeyuki Yamakita, Shizuoka (JP)

(73) Assignees: PANASONIC ENERGY CO., LTD., Osaka (JP); PANASONIC HOLDINGS CORPORATION, Kadoma Osaka (JP)

( * ) Notice: Subject to any disclaimer, the term of this patent is extended or adjusted under 35 U.S.C. 154(b) by 764 days.

(21) Appl. No.: 16/088,271

(22) PCT Filed: Mar. 10, 2017

(86) PCT No.: PCT/JP2017/009698
§ 371 (c)(1),
(2) Date: Sep. 25, 2018

(87) PCT Pub. No.: WO2017/169655
PCT Pub. Date: Oct. 5, 2017

(65) Prior Publication Data
US 2020/0303929 A1    Sep. 24, 2020

(30) Foreign Application Priority Data
Mar. 30, 2016   (JP) ................. 2016-067790

(51) Int. Cl.
*H02J 3/32*     (2006.01)
*H02J 7/00*     (2006.01)
*H02J 7/02*     (2016.01)

(52) U.S. Cl.
CPC .............. *H02J 3/32* (2013.01); *H02J 7/0013* (2013.01); *H02J 7/02* (2013.01)

(58) Field of Classification Search
CPC ..................................................... H02J 7/0013
See application file for complete search history.

(56) References Cited

U.S. PATENT DOCUMENTS

2004/0138785 A1* 7/2004 Emori ................... H02J 7/0021
                                                                    700/286
2009/0261658 A1   10/2009 Kato
(Continued)

FOREIGN PATENT DOCUMENTS

JP   2009-261183 A   11/2009
JP   2010-92841 A    4/2010
(Continued)

OTHER PUBLICATIONS

WO2012043133A1 translation Murishima, Storage Battery Charging/Discharging Control Device and Storage Battery Charging/Discharging Control Method (Year: 2012).*
(Continued)

*Primary Examiner* — Drew A Dunn
*Assistant Examiner* — Tynese V McDaniel
(74) *Attorney, Agent, or Firm* — WHDA, LLP (57) ABSTRACT

The power conditioner determines possible total power and working individual power to be in a range that possible individual power of each of the power supply units is not exceeded. The possible total power is determined from the possible individual power, of each of the power supply units, determined based on the battery information detected by each of the unit controllers, collected by a master controller from each of the unit controllers. The working individual power is determined based on a power deviation indicating a difference of charging and discharging power between the
(Continued)

power supply units. The power conditioner causes charging and discharging of each of the power supply units within the calculated working individual power.

10 Claims, 6 Drawing Sheets

(56) References Cited

U.S. PATENT DOCUMENTS

| | | | |
|---|---|---|---|
| 2010/0028723 A1 | 2/2010 | Haba | |
| 2012/0176094 A1* | 7/2012 | Okuda | H01M 10/482 320/134 |
| 2012/0176095 A1* | 7/2012 | Okuda | H02J 7/0071 320/134 |
| 2012/0194139 A1* | 8/2012 | Sasaki | H01M 10/0525 320/126 |
| 2012/0262122 A1* | 10/2012 | Sato | H02J 7/0031 320/128 |
| 2013/0009605 A1* | 1/2013 | Hongo | H02J 7/0026 320/134 |
| 2013/0181526 A1* | 7/2013 | Iwasaki | H02J 3/381 307/43 |
| 2013/0187466 A1* | 7/2013 | Sakai | G01R 19/16542 307/52 |
| 2016/0181838 A1* | 6/2016 | Bryngelsson | B60L 58/15 320/112 |
| 2018/0145378 A1* | 5/2018 | Fujita | H02J 7/0016 |

FOREIGN PATENT DOCUMENTS

| | | | |
|---|---|---|---|
| WO | 2012/043133 A1 | 4/2012 | |
| WO | 2012/050004 A1 | 4/2012 | |
| WO | WO-2012043133 A1 * | 4/2012 | H01M 10/441 |

OTHER PUBLICATIONS

International Search Report dated Apr. 18, 2017, issued in counterpart International Application No. PCT/JP2017/009698 (1 page).

* cited by examiner

| Condition No. | Power command | POB all | SOP all | #1 SOP N=1 | #1 Discharge SOP | #1 Charge SOP | #2 SOP N=2 | #2 Discharge SOP | #2 Charge SOP | #3 SOP N=3 | #3 Discharge SOP | #3 Charge SOP | #4 SOP N=4 | #4 Discharge SOP | #4 Charge SOP | State | Result |
|---|---|---|---|---|---|---|---|---|---|---|---|---|---|---|---|---|---|
| Power deviation | | | | | | | | | | | | | | | | | |
| ① | 160 | 160 | 240 | 40 | 1 | 60 | 40 | 1 | 60 | 40 | 1 | 60 | 40 | 1 | 60 | | |
| ② | 240 | 240 | 240 | 60 | | | 60 | | 60 | 60 | | 60 | 60 | | 60 | | |
| ③ | 240 | 180 | 180 | Stop | | 0 | 60 | | 60 | 60 | | 60 | 60 | | 60 | #1 full charge | |
| ④ | 240 | 80 | 80 | 20 | | 20 | 20 | | 60 | 20 | | 60 | 20 | | 60 | #1: CV | |
| Power deviation | | | | | | | | | | | | | | | | | |
| ⑤ | 160 | 160 | 240 | 50 | 5 | 60 | 40 | 4 | 60 | 40 | 4 | 60 | 30 | 3 | 60 | | |
| ⑥ | 240 | 240 | 240 | 75 | | | 80 | | 60 | 80 | | 60 | 45 | | 60 | | |
| ⑦ | 240 | 180 | 180 | Stop | | 0 | 65 | | 60 | 65 | | 60 | 49 | | 60 | #1 full charge | POBn ≤ SOPn Not hold |
| ⑧ | 240 | 80 | 80 | 25 | | 20 | 20 | | 60 | 20 | | 60 | 15 | | 60 | #1: CV | |

FIG. 5

| Condition No. | Power command | POB all | SOP all | #1 SOP N=1 | #1 Discharge SOP | #1 Charge SOP | #2 SOP N=2 | #2 Discharge SOP | #2 Charge SOP | #3 SOP N=3 | #3 Discharge SOP | #3 Charge SOP | #4 SOP N=4 | #4 Discharge SOP | #4 Charge SOP | State | Result |
|---|---|---|---|---|---|---|---|---|---|---|---|---|---|---|---|---|---|
| Power deviation | | | | | | | | | | | | | | | | | |
| ① | 160 | 160 | 240 | 40 | 1 | 60 | 40 | 1 | 60 | 40 | 1 | 60 | 40 | 1 | 60 | | |
| ② | 240 | 240 | 240 | 60 | | 0 | 60 | | 60 | 60 | | 60 | 60 | | 60 | | |
| ③ | 240 | 180 | 180 | Stop | 60 | 0 | 60 | 60 | 60 | 60 | 60 | 60 | 60 | 60 | 60 | #1: full charge | |
| ④ | 240 | 80 | 80 | 20 | 5 | 20 | 20 | 4 | 60 | 20 | 4 | 60 | 20 | 3 | 60 | #1: CV | |
| Power deviation | | | | | | | | | | | | | | | | | |
| ⑤ | 160 | 160 | 192 | 50 | | 60 | 40 | | 60 | 40 | | 60 | 30 | | 60 | | |
| ⑥ | 240 | 192 | 192 | 60 | | 0 | 48 | | 60 | 48 | | 60 | 36 | | 60 | | |
| ⑦ | 240 | 165 | 165 | Stop | 60 | 0 | 60 | 60 | 60 | 60 | 60 | 60 | 45 | 60 | 60 | #1: full charge | POBn ≤ SOPn |
| ⑧ | 240 | 64 | 64 | 20 | | 20 | 16 | | 60 | 16 | | 60 | 12 | | 60 | #1: CV | |

FIG. 6

POWER SUPPLY SYSTEM, CONTROL SYSTEM AND POWER CONTROL METHOD FOR POWER SUPPLY SYSTEM

TECHNICAL FIELD

The present invention relates to a power supply system and a power conditioner.

BACKGROUND ART

A power supply device including a number of serial and parallel connected secondary batteries is used as a power storage for peak cutting in home use, business facility use, factory use, and the like. Alternatively, the power supply device is used also in a power plant and the like. The peak cutting is performed to supply electric power in a time slot in which electric power consumption is at its peak (for example, around 1 pm to 4 pm) such that electric power is charged in the power supply device in the other time slots (for example, in the middle of the night) and the charged electric power is discharged at a peak time slot to supplement electric power at a peak time. In particular, in recent years, use of the natural energy represented by solar power generation and wind-power generation has been gathering attention; however, an electric source of these natural energies is not stable, and the power supply device is therefore used also in order to realize stable supply of electric power in a power system network by storing electric power temporarily in the power supply device in a power plant or a substation and by discharging the stored electric power.

In such a power supply device, in order to store a large amount of electric power, a number of secondary batteries are connected to configure a modularized power supply device, and a plurality of power supply units are combined to structure a power supply system, so that increased electric power can be supplied (for example, see PTL 1). The power supply units in such a power supply system is managed by a high-order controller that totally manages the power supply units, and the overall power control is performed by a power conditioner. The power conditioner performs power control of each power supply unit such that the each power supply unit is charged and discharged.

CITATION LIST

Patent Literature

PTL 1: Unexamined Japanese Patent Publication No. 2010-092841

SUMMARY OF THE INVENTION

Technical Problem

However, the power supply system according to the background art has a problem that when there occurs a power deviation among the power supply units, the power control cannot be performed appropriately. For example, if only one power supply unit is used, the power conditioner communicates with the power supply unit on a one-on-one basis, and the power control of charging and discharging can be performed relatively easily.

Figure 2:
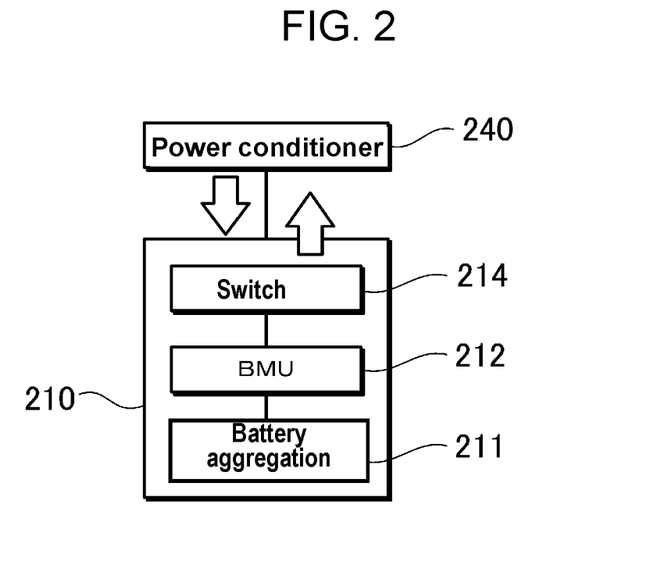
FIG. 2 is a block diagram showing a power supply system in which a single power supply unit is connected to a single power conditioner.

FIG. 2 shows a power supply system in which power conditioner 240 controls charging and discharging power of one power supply unit 210. Power supply unit 210 shown in this drawing includes switch 214, unit controller (a battery management unit: hereinafter, referred to as a "BMU") 212 and battery aggregation 211. Switch 214 is a component for switching between a connected state in which power supply unit 210 is connected to power conditioner 240 and a shut-off state in which power supply unit 210 is shut off at the time of abnormality or the like. BMU 212 is a component for monitoring a condition of battery aggregation 211. Further, BMU 212 communicates the condition of the battery aggregation to power conditioner 240. On the basis of the condition of the battery aggregation, power conditioner 240 determines the electric power of charging and discharging and communicates the electric power to BMU 212 of power supply unit 210 to perform charging and discharging. Here, the information communicated from power supply unit 210 to power conditioner 240 includes possible charging and discharging power (a state of power: hereinafter, referred to as a "SOP"), which is maximum power at the time of communicating the information, and power supply unit 210 can be charged and discharged at the maximum power. Regarding an example of the SOP communicated from power supply unit 210 to power conditioner 240, the charging SOP is maximized when power supply unit 210 is constant-current charged, and the charging SOP is gradually decreased when power supply unit 210 is constant-voltage charged. Further, when power supply unit 210 becomes fully charged, the charging SOP is set to 0, and at the same time, the discharging SOP is maximized. In addition, when power supply unit 210 is completely discharged, the discharging SOP is set to 0, and the charging SOP is maximized. Further, if power supply unit 210 operates abnormally or is broken, the discharging SOP and the charging SOP are both set to 0. Further, when battery aggregation 211 is in a constant current (CC) charging and discharging region, the charging SOP and the discharging SOP are normally at their maximum.

On the other hand, power conditioner 240 communicates a charging and discharging power command value (a power of battery: hereinafter, referred to as a "POB") to power supply unit 210 on the basis of a power command value from a high-order system or from outside, and the SOP. Thus, POB SOP is constantly satisfied.

Figure 3:
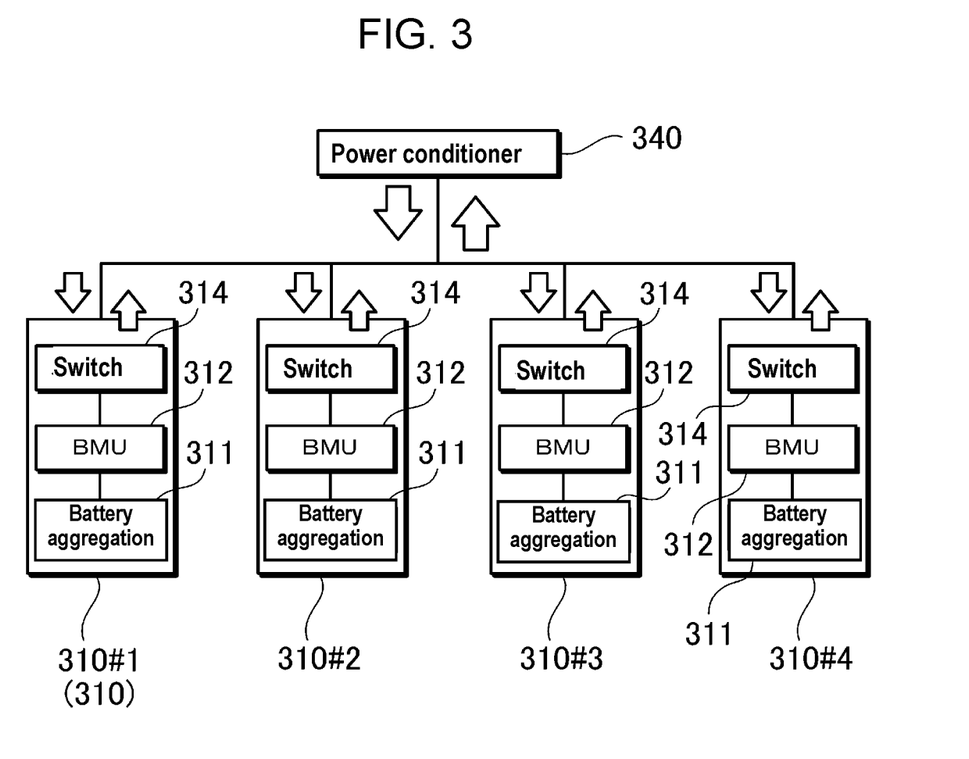
FIG. 3 is a block diagram showing a power supply system in which a plurality of power supply units are connected to a single power conditioner.

As described above, if a number of power supply units 210 connected to power conditioner 240 is one, power conditioner 240 communicates with the power supply unit on a one-on-one basis; therefore, the control of charging and discharging power can be relatively easily performed. In contrast, if a plurality of power supply units are connected to a single power conditioner, the configuration is as shown in FIG. 3. In this example, four power supply units 310 are connected to single power conditioner 340. Each power supply unit 310 includes unit controller (BMU) 312, switch 314, and battery aggregation 311.

Power conditioner 340 receives SOP1 to SOP4 from power supply units 310 #1 to 310 #4, respectively, and calculates the possible charging and discharging power (herein after, referred to as a "total SOP") of all power supply units 310. Here, the total SOP is calculated by the following equation, supposing that power supply unit 310 satisfying SOP=0 is to be separated from power conditioner 340.

Total SOP=(minimum SOP of SOP$n$)×(total number of power supply unit not satisfying SOP=0)

where n=1 to N, and N is a total number of the power supply units.

With this total SOP used as an upper limit, power conditioner 340 determines the total charging and discharging power (total POB) from the power command value and performs the charging and discharging on power supply units 310 at electric power of the total POB. In this way, power conditioner 340 suppresses the electric power such that the electric power is kept equal to or smaller than the total SOP. With this arrangement, the electric power can be appropriately suppressed even in a case in which the SOP has become 0 for some reason, for example, in a case in which a certain power supply unit stops. Further, even if the SOP of a certain power supply unit becomes low, the electric power can be suppressed equal to or smaller than the minimum SOP. In other words, $POBn \leq SOPn$ holds. Note that power supply unit 301 satisfying SOP=0 is supposed to be separated; however, in the case in which power supply unit 301 is not separated, $POBn \leq SOPn$ can be satisfied by setting the total SOP to 0.

However, battery conditions of the power supply units are not necessarily constant, and the degree of deterioration and the like of the power supply units have variations, which differences tend to become larger with the duration of use. Here, the conditions of the secondary battery cells included in each of the power supply units have variations of characteristics among the power supply units, for example, an internal resistance, a voltage, an SOC (state of charge), a degree of degradation, a temperature, and the like, in addition, the variations of wiring resistances and the like, and current ratios among the power supply units are thus not equal. Therefore, there are current deviations occurring among the power supply units, which state is referred to as a power deviation.

The charging and discharging control, of above power conditioner 340 in the configuration of FIG. 3, based on the total SOP is based on the assumption that there is no power deviation occurring among power supply units 310. In other words, if a power deviation occurs among power supply units 310, the rating or the SOP can be exceeded in some power supply unit 310 if electric power suppression is based on the total SOP. In other words, if a power deviation occurs, $POBn \leq SOPn$ may not hold in some cases. As a result, the power supply system can abnormally stop for a reason such as an abnormal current.

The present invention has been made in view of the above background. One of objects of the present invention is to provide a power supply system and a power conditioner in which it is possible to appropriately control charging and discharging even if a power deviation occurs between power supply units in a power supply system using a plurality of power supply units.

Solution to Problem

A power supply system according to a first aspect of the present invention can be configured to include: a plurality of power supply units; and a control system to which the power supply units are parallel connected. Each of the power supply units includes: a battery aggregation including a plurality of secondary battery cells serial and parallel connected, a unit controller that acquires battery information about electric power at which the battery aggregation is chargeable and dischargeable and that outputs the battery information to the control system; and a switch that switches connection and disconnection between the power supply unit and the control system. The control system includes: a power conditioner that is parallel connected to the plurality of power supply units and is connected to an external power system, and receives electric power from the power system and charges the power supply units with the received electric power, and receives electric power from the power supply units and discharges the received electric power to the power system; a master controller that collects the battery information output from the unit controller of each of the power supply units; and a system controller that communicates to the power conditioner electric power required to the power supply system as a power command. In a case where the power conditioner determines, according to the power command from the system controller, a working total power POBall, which is a summation of electric power at which each of the power supply units is charged and discharged, the power conditioner determines possible total power to be in a range that possible individual power of each of the power supply units is not exceeded. The possible total power is determined from the possible individual power, of each of the power supply units, determined based on the battery information detected by each of the unit controllers, collected by the master controller from each of the unit controllers. The power conditioner causes charging and discharging of each of the power supply units within the calculated working individual power With the above configuration, even in a situation in which there is a power deviation, $POBn \leq SOPn$ holds, the system does not stop, and an operation of charging and discharging can therefore be continued. This makes it possible to perform charging and discharging control depending on the power deviation, and an unintended system failure can thus be avoided.

Further, in a power supply system according to a second aspect of the present invention, the master controller can be configured to detect a power deviation between the power supply units and to send out the power deviation to the power conditioner. The above configuration enables appropriate adjustment of charging and discharging power.

Further, in a power supply system according to a third aspect of the present invention, the master controller can be configured to detect the power deviation between the power supply units at a predetermined cycle or at a time when a change in electric power is detected, and to constantly suppress the working individual power equal to or smaller than individual maximum charging and discharging power (SOP), based on the detected power deviation. The above configuration enables appropriate adjustment of the charging and discharging power, coping with the battery condition temporally varying from hour to hour. When it is measured by the above configuration at an appropriate time whether there is a power deviation occurring, it is possible to perform the charging and discharging control depending on the power deviation, and an unintended system failure can thus be avoided.

Still further, in a power supply system according to a fourth aspect of the present invention, each of the unit controllers can be configured to determine the possible individual power, based on the battery information of the battery aggregation connected to each of the unit controllers.

Still further, in a power supply system according to a fifth aspect of the present invention, the master controller can be configured to determine the working individual power, based on the possible individual power sent out from each of the unit controllers connected to the master controller.

Still further, in a power supply system according to a sixth aspect of the present invention, the master controller can be configured to calculate power deviation ratio DOBn of each of the power supply units, assuming that a ratio for power supply unit #m, which is one of power supply units #1 to #n and with which (n-th working individual power POBn)/(n-th possible individual power SOPn) is largest, is 1, where 1≤m≤n.

Still further, in a power supply system according to a seventh aspect of the present invention, the master controller can be configured to determine the possible total power by the following equation.

Possible total power=SOP$m$×(working total power)/($m$-th working individual power POB$m$)

Still further, in a power supply system according to an eighth aspect of the present invention, the power conditioner can be configured to turn off the switch of the power supply unit that is one of the power supply units and whose possible individual power has become 0. By separating a power supply unit whose SOP has become 0 from the power conditioner with the above configuration, the power supply unit can be protected from being overcharged or overdischarged.

Still further, a control system according to a ninth aspect of the present invention can be configured such that each of the switches includes a charge switch and a discharge switch. The power conditioner turns off the charge switch of the power supply unit that is one of the power supply units and whose chargeable individual power has become 0, and the power conditioner turns off the discharge switch of the power supply unit that is one of the power supply units and whose dischargeable individual power has become 0.

Still further, a control system according to a tenth aspect of the present invention is a control system for a power supply system in which a plurality of power supply units are parallel connected and in which charging and discharging of each of the power supply units is controlled, and the control system can be configured to include: a power conditioner that is parallel connected to a plurality of power supply units and is connected to an external power system, and receives electric power from the power system and charges the power supply units with the received electric power, and receives electric power from the power supply units and discharges the received electric power to the power system; a master controller that collects battery information having been output from each of the power supply units; and a system controller that communicates to the power conditioner electric power required to the power supply system as a power command. The power conditioner causes charging and discharging of each of the power supply units within working individual power, based on possible total power at which all the power supply units are chargeable and dischargeable. The possible total power is determined from possible individual power, of each of the power supply units, determined based on the battery information detected on each of the power supply units. The working individual power is determined based on a power deviation indicating a difference of a charging and discharging power between the power supply units.

The above configuration makes it possible to perform charging and discharging control depending on the power deviation, and an unintended system failure can thus be avoided.

Still further, a power control method of a power supply system according to an eleventh aspect of the present invention is a power control method in a power supply system including a plurality of power supply units and a control system to which the plurality of power supply units are parallel connected, and the power control method can include the steps of: receiving, by the control system, electric power required to the power supply system as a power command; acquiring battery information about electric power at which a battery aggregation included in each of the power supply units is chargeable and dischargeable, and outputting the acquired battery information to the control system, wherein the battery aggregation includes a plurality of secondary battery cells serial or parallel connected; determining, based on the battery information of the power supply units: possible individual power indicating electric power at which each of the power supply units is chargeable and dischargeable; possible total power indicating electric power at which all the power supply units are chargeable and dischargeable; and a power deviation indicating a difference of charging and discharging power between the power supply units, determining, based on the determined possible individual power, the determined possible total power, the determined power deviation, and the power command, working individual power in a range that the working individual power does not exceed the possible individual power of each of the power supply units, wherein the working individual power is electric power at which each power supply unit is charged and discharged.

This makes it possible to perform charging and discharging control depending on the power deviation, and an unintended system failure can thus be avoided.

DESCRIPTION OF EMBODIMENT

An exemplary embodiment of the present invention is described below with reference to the drawings. However, the exemplary embodiment described below shows an example of the present invention, and the present invention is not limited to the following example. Further, in the present specification, components shown in the claims are not limited to the components of the exemplary embodiment. In particular, it is not intended to limit the sizes, materials, and shapes of components and relative arrangement between the components, which are described in the exemplary embodiment, to the scope of the present invention unless otherwise specified. The sizes and the like are mere explanation examples. However, the sizes and the positional relation of the components in each drawing are exaggerated for clearing the explanation in some cases. Furthermore, in the following description, the same names or the same reference marks denote the same components or the same types of components, and detailed description is therefore appropriately omitted. Further, regarding the elements constituting the present invention, a plurality of elements may be formed of the same component, and a single component may serve as a plurality of elements. To the contrary, the function of a single component may be realized by a plurality of components in cooperation.

Hereinafter, as an example of a power supply system according to an exemplary embodiment of the present invention, an example is described in which the present invention is applied to a large-scale power storage device to be used for a natural energy power plant and the like such as solar power generation and wind-power generation. This power storage device once stores electric power generated by solar power generation or wind-power generation and then supplies the electric power to power system ES.

Figure 1:
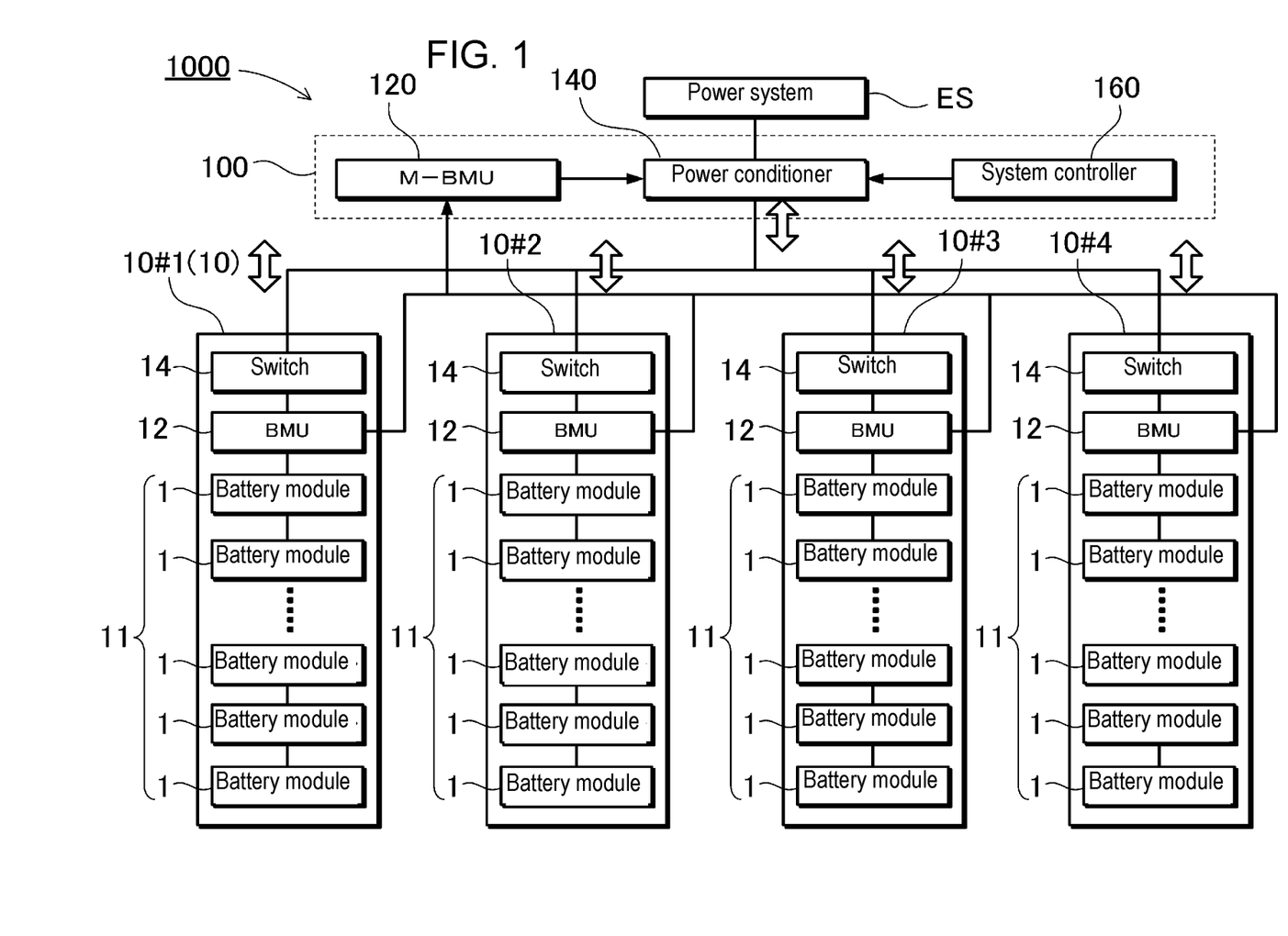
FIG. 1 is a block diagram showing a power supply system according to an exemplary embodiment of the present invention.

FIG. 1 is a block diagram showing power supply system 1000 according to an exemplary embodiment of the present invention. Power supply system 1000 shown in this drawing includes a plurality of power supply units 10 and control system 100 to which these power supply units 10 are parallel connected. Control system 100 includes power conditioner 140, system controller 160, and master controller (M-BMU) 120.

(Power Supply Unit 10)

Each power supply unit 10 includes battery aggregation 11, unit controller (BMU) 12, and switch 14. In each battery aggregation 11, a plurality of battery modules 1 are series and parallel connected. Further, each battery module 1 is configured with a plurality of series and parallel connected secondary battery cells.

(Unit Controller 12)

Unit controller 12 is connected to battery aggregation 11 and acquires battery information relating to electric power at which battery aggregation 11 can be charged and discharged. Unit controller 12 is connected to master controller 120 and outputs the battery information.

Here, the battery information represents conditions of battery aggregations 11 (or battery modules or secondary battery cells constituting battery aggregations 11) included in power supply units 10, for example, internal resistances, voltages, currents, SOCs, degrees of degradation, temperatures, and the like.

(Switch 14)

Switch 14 is a component for switching connection and disconnection between each power supply unit 10 and power conditioner 140. In the example of FIG. 1, switch 14 is disposed between battery aggregation 11 and power conditioner 140 and is switched on and off by unit controller 12. Switch 14 may be separately disposed in a charging direction and in a discharging direction. In this case, the switch includes a charge switch and a discharge switch. Then, the power conditioner turns off the charge switch of a power supply unit whose chargeable individual power has become 0, and turns off the discharge switch of a power supply unit whose dischargeable individual power has become 0, among the power supply units.

(Control System 100)

On the other hand, control system 100 includes power conditioner 140, system controller 160, and master controller 120. Regarding these components, instead of preparing individual components as shown FIG. 1, arbitrary components can be integrated into one body.

(Power Conditioner 140)

Power conditioner 140 is parallel connected to switches 14 of power supply units 10. Further, power conditioner 140 is connected to a power system. Power conditioner 140 receives electric power from the power system to charge power supply units 10, and conversely receives electric power from power supply units 10 to discharge the electric power to the power system.

(System Controller 160)

System controller 160 is a component to communicate to power conditioner 140 electric power of charging and discharging required to power supply system 1000 as a power command. System controller 160 receives a power command value, for example, through communication with a high-order system or an external device. Alternatively, system controller 160 may be configured to autonomously generate a power command value.

(Master Controller 120)

Master controller 120 is connected to unit controller 12 of each power supply unit 10 to collect information (battery information) about a battery condition of each power supply unit 10. Further, master controller 120 determines a possible total power SOPall at which all power supply units 10 can be charged and discharged on the basis of the collected battery information. On the basis of the possible total power determined by master controller 120, power conditioner 140 inputs and outputs electric power for charging and discharging, from and to power supply unit 10.

In this control system 100, system controller 160 communicates a power command to power conditioner 140. On the other hand, master controller 120 sends out the battery information from each of unit controllers 12 to power conditioner 140. Power conditioner 140 receives this information and determines a possible total power SOPall (hereinafter, also referred to as a "total SOP") at which all power supply units 10 can be charged and discharged on the basis of the battery information sent out from master controller 120. On the other hand, the power deviation among power supply units 10 is detected, and a working total power POBall (hereinafter, also referred to as a "total POB") is determined on the basis of the power deviation, where the working total power POBall is a summation of electric power at which each power supply unit 10 is charged and discharged, and charging and discharging are then performed on power supply units 10 at the total POB. Since the charging and discharging are performed at the total POB, a working individual power POBn, which is an individual charging and discharging power for each power supply unit 10, is determined (the power deviation will be described later in detail).

Note that the possible total power and the possible individual power may be determined by the master controller or the unit controller other than by power conditioner 140. For example, the unit controller determines the possible individual power of the power supply unit on the basis of the battery information of the battery aggregation connected to the unit controller. In the example of FIG. 1, unit controllers 12 of respective power supply units 10 calculate a possible individual power SOP1 of power supply unit 10 #1, a possible individual power SOP2 of power supply unit 10 #2, a possible individual power SOP3 of power supply unit 10 #3, and a possible individual power SOP4 of power supply unit 10 #4. On the basis of the thus calculated possible individual power of power supply units 10, the possible total power SOP is calculated by master controller 120. Further, master controller 120 and unit controllers 12 control turning on and off of switches 14 such that, if the SOP is 0 or abnormality has occurred in one of power supply units 10, the one of power supply units 10 is separated from power conditioner 140. By this operation, even if certain power supply unit 10 stops or the SOPn has become 0, an appropriated power control operation is ensured.

(Power Control Method By Power Supply System Relating to Comparative Example)

Here, a description is given to electric current control on the power supply unit in a power supply system according to the comparative example. In the power supply system relating to the comparative example, a chargeable and dischargeable maximum power is calculated for each power supply unit. Then, from the SOPn of each power supply unit, the total SOP is calculated and is communicated to the power conditioner. For example, the possible total power SOP can be expressed by the following equation, where a number of the connected power supply units is n.

Possible total power SOP=(minimum SOP of SOP$n$)×(connection number of power supply units being connected to the power conditioner)    Equation 1

With this arrangement, even when the possible individual power SOP of a certain power supply unit becomes low, the electric power can be kept to the minimum SOP or smaller. In other words, with respect to each power supply unit, POBn≤SOPn holds.

(Power Deviation)

Equation 1 holds appropriately when there is no power deviation occurring among the power supply units. However, in practice, the possible individual power of each power supply unit depends on a battery condition and is not necessarily constant. Therefore, among the power supply units, there occurs a variation in a possible individual power, in other words, a power deviation. As a result, in the power control based on the above-described total SOP, POBn≤SOPn may not hold for a certain power supply unit, and a rating or an individual SOP may be exceeded. In this case, there is a concern that the power supply system may stop due to an abnormal current or other causes. To address this issue, in the present exemplary embodiment, charging and discharging control is performed in view of such a power deviation.

Figure 4:
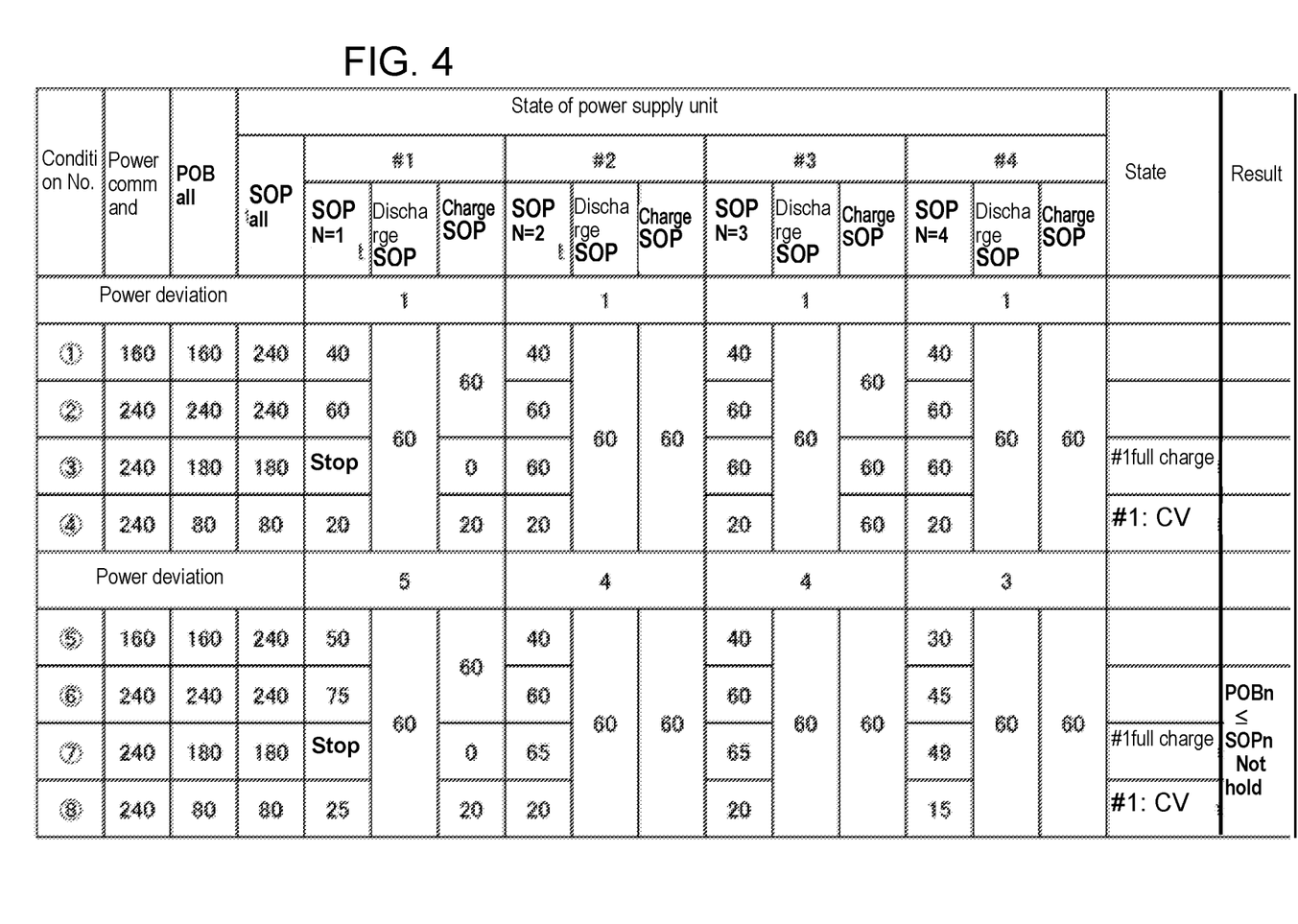
FIG. 4 is a table showing conditions of each battery module of FIG. 3 at a time of power control of each power supply unit.

Here, in order to describe a problem caused by a power deviation, a discussion is made on a power supply system as the power supply system relating to the comparative example, in which four power supply units 310 #1 to 310 #4 are connected to common power conditioner 340 as shown in FIG. 3. FIG. 4 shows conditions of the battery modules at the time of the power control by which power supply units 310 are charged and discharged. In this table, among condition numbers 1 to 8, there are differences in the power commands sent from system controller 160, and the battery conditions, possible individual power, and the like of the battery modules. In the upper columns of FIG. 4 (condition numbers 1 to 4), there is no power deviation occurring among power supply units 310 #1 to 310 #4, in other words, the columns show the conditions of the battery modules in which a ratio of the possible individual power of power supply units 310 is 1:1:1:1. On the other hand, in the lower columns of FIG. 4 (condition numbers 5 to 8), there are power deviations occurring among power supply units 310 #1 to 310 #4, and the columns show the conditions of the battery modules in which the current ratio of power supply units 310 is 5:4:4:3. Note that the power command and the total SOP are made to correspond to one another between condition numbers 1 to 4 and condition number 5 to 8.

(Comparative Example: When There is no Power Deviation)

In FIG. 4, for example, in the case of condition number 1, with respect to the possible individual power SOP1 to SOP4 of power supply units 310 #1 to 310 #4, a dischargeable individual power SOP representing a dischargeable electric power (hereinafter, also referred to as a "discharging SOP") and a chargeable individual power SOP (hereinafter, also referred to as a "charging SOP") representing chargeable electric power are both 60 kW. Therefore, the minimum SOP of SOPn is calculated to be 60 kW according to Equation 1, and a possible total power SOPall for all power supply units 310 #1 to 310 #4 is 60 kW×4=240 kW for both of discharging and charging. In addition, the power command sent from system controller 160 is 160 kW and is within the possible total power SOPall, and the working total power POBall can be 160 kW, which is the same as the power command. Therefore, this power command can be executed. Further, the working individual power of each power supply unit 310 is 160 kW×1/4=40 kW. Here, since the possible individual power SOP1 to SOP4 of power supply units 310 are each 60 kW for both of the discharging SOP and the charging SOP as described above, the working individual power of 40 kW can be dealt with, and POBn≤SOPn thus holds.

Similarly, in the case of condition number 2, as is the case with condition number 1, the possible total power SOPall is 60 kW×4=240 kW for both of discharging and charging. In addition, since the power command is 240 kW, the workable electric power POBall is similarly 240 kW, and each working individual power is 60 kW. Here, since the possible individual power of each power supply unit 310 is 60 kW for both of the discharging SOP and the charging SOP, the working individual power of 60 kW can be dealt with, and POBn≤SOPn thus holds.

On the other hand, in the case of condition number 3, the possible individual power SOP of each of power supply units 310 #2 to 310 #4 is 60 kW for both of the charging SOP and the discharging SOP as is the case with condition numbers 1 and 2. In addition, power supply unit 310 #1 is in a fully-charged condition or in a condition in which charging is prohibited for some reason, and the discharging SOP and the charging SOP are respectively 60 kW and 0. Therefore, discharging is possible; however, at the time of charging, switch 14 is turned off to be separated from power conditioner 140, and power supply unit 310 #1 is not charged. In this condition, the possible total power SOPall at the time of charging is 60 kW×3=180 kW. Here, if the power command for charging is 240 kW, the power command is greater than the possible total power SOPall; therefore, the working total power POBall is limited to 180 kW. Further, regarding the working individual power of each power supply unit 310, power supply unit 310 #1 is separated from power conditioner 140 and is thus not an object of charging; the working individual power POB2 to POB4 of power supply units 310 #2 to 310 #4 each are 180 kW×(1/3)=60 kW.

Moreover, in the case of condition number 4, regarding possible individual power SOP for each of power supply units 310 #2 to 310 #4, the charging SOP and the discharging SOP are both 60 kW as is the case with condition numbers 1 to 3, but power supply unit 310 #1 is being charged with a constant current or is in a condition in which the charging power is set lower than other power supply units 310 #2 to 310 #4 because of some reason. Thus, the discharging SOP is 60 kW, but the charging SOP is 20 kW. In this condition, since the minimum SOP at the time of charging is 20 kW, the possible total power SOPall is 20 kW×4=80 kW according to Equation 1. Here, if the power command is 240 kW, the power command is greater than the possible total power SOPall, and the working total power POBall is therefore limited to 80 kW. In addition, the working individual power for charging each of power supply units 310 #1 to 310 #4 is 80 kW×1/4=20 kW. On the other hand, regarding the possible individual power of each power supply unit 310, the discharging SOP of each power supply unit 310 is 60 kW, the charging SOP of power supply unit 310 #1 is 20 kW, and the charging SOP of each of power supply units 310 #2 to 310 #4 is 60 kW. Therefore, every power supply unit can deal with working individual power of 20 kW, and POBn ≤ SOPn thus holds. Note that when battery aggregation 11 is in a constant current (CC) charging and discharging region, the charging SOP and the discharging SOP are normally both at their maximums.

(Comparative Example: When There is Power Deviation)

As described above, in the condition in which there is no power deviation among power supply units 310, charging and discharging power control can be appropriately performed in any of the cases of condition numbers 1 to 4. Next, a discussion is made on condition numbers 5 to 8, in which the power deviations among power supply units 310 #1 to 310 #4 are represented by a current ratio of 5:4:4:3. Note that the power command, the total POB, the discharging SOP, and the charging SOP are made to correspond to one another between condition numbers 5 to 8 and condition numbers 1 to 4.

First, in the case of condition number 5, regarding the possible individual power SOP of power supply units 310 #1 to 310 #4, the charging SOP and the discharging SOP are both 60 kW as is the case with condition number 1; therefore, the possible total power SOPall, which is a summation of the possible individual power SOP of power supply units 310 #1 to 310 #4, is calculated to be 60 kW×4=240 kW according to Equation 1. In addition, since the power command is 160 kW and is within the possible total power SOPall, the working total power POBall can be 160 kW, which is the same as the power command. Therefore, this power command can be executed. Further, regarding the working individual power of each of power supply units 310, the working total power POBall is distributed based on the power deviation. Here, since the power deviation is 5:4:4:3, when 160 kW is distributed according to this ratio, the working individual power POB1 of power supply unit 310 #1 is 160 kW×(5/16)=50 kW, the working individual power POB2 of power supply unit 310 #2 is 160 kW×(4/16)=40 kW, the working individual power POB3 of power supply unit 310 #3 is 160 kW×(4/16)=40 kW, and the working individual power POB4 of power supply unit 310 #4 is 160 kW×(3/16)=30 kW. Since any working individual power POBn is within the charging SOP and the discharging SOP, POBn ≤ SOPn holds, and charging and discharging can thus be appropriately performed.

Next, in the case of condition number 6, regarding the possible individual power SOP of power supply units 310 #1 to 310 #4, the charging SOP and the discharging SOP are both 60 kW as is the case with condition number 2 and condition number 5; therefore, the possible total power SOPall is 60 kW×4=240 kW. In addition, since the power command is 240 kW and is within the possible total power SOPall, the working total power POBall can be 240 kW, which is the same as the power command. However, when the working individual power of each of power supply units 310 is distributed according to the power deviation, the working individual power POB1 of power supply unit 310 #1 is 240 kW×(5/16)=75 kW, the working individual power POB2 of power supply unit 310 #2 is 240 kW×(4/16)=60 kW, the working individual power POB3 of power supply unit 310 #3 is 240 kW×(4/16)=60 kW, and the working individual power POB4 of power supply unit 310 #4 is 240 kW×(3/16)=45 kW. In this case, POBn ≤ SOPn holds for power supply units 310 #2 to 310 #4, but for power supply unit 310 #1, the working individual power POB1 is 75 kW and exceeds 60 kW of the possible individual power SOP1; therefore, POBn ≤ SOPn does not hold, and the rating is exceeded.

Further, in the case of condition number 7, regarding the possible individual power SOP of each of power supply units 310 #2 to 310 #4, the charging SOP and the discharging SOP are both 60 kW as is the case with condition number 3. However, power supply unit 310 #1 is in a fully-charged condition or a condition in which charging is prohibited because of some reason; therefore, the discharging SOP is 60 kW, but the charging SOP is 0. Therefore, charging is possible, but power supply unit 310 #1 is separated from the power supply system at the time of charging. Therefore, power supply unit 310 #1 is not charged. In this condition, the possible total power SOPall at the time of charging is 60 kW×3=180 kW. Here, if the power command for charging is 240 kW, the power command exceeds the possible total power SOPall; therefore, the working total power POBall is limited to 180 kW. Further, regarding the working individual power of charging each power supply unit 310, since power supply unit 310 #1 does not function because of being separated, the working individual power POB2 of power supply unit 310 #2 is 180 kW×(4/16)=65 kW, the working individual power POB3 of power supply unit 310 #3 is 180 kW×(4/16)=65 kW, and the working individual power POB4 of power supply unit 310 #4 is 180 kW×(3/16)=49 kW. In this case, POBn ≤ SOPn holds for power supply unit 310 #4; however, for power supply units 310 #2 and 310 #3, although each of the possible individual power SOP2 and SOP3 is 60 kW, each of the working individual power POB2 and POB3 is 65 kW. As a result, POBn ≤ SOPn does not hold at the time of charging, and the rating is exceeded.

Further, in the case of condition number 8, regarding possible individual power SOP for each of power supply units 310 #2 to 310 #4, the charging SOP and the discharging SOP are both 60 kW, but power supply unit 310 #1 is being charged with a constant voltage or is in a condition in which the charging power is set lower than other power supply units 310 #2 to 310 #4 because of some reason. Therefore, the discharging SOP is 60 kW, but the charging SOP is 20 kW. In this condition, the possible total power SOPall at the time of charging is calculated to be 20 kW×4=80 kW according to Equation 1. Here, if the power command is 240 kW, the power command is greater than the possible total power SOPall, and the working total power POBall is therefore limited to 80 kW. Further, regarding the working individual power of charging each power supply unit 310, the working individual power POB1 of power supply unit 310 #1 is 80 kW×(5/16)=25 kW, the working individual power POB2 of power supply unit 310 #2 is 80 kW×(4/16)=20 kW, the working individual power POB3 of power supply unit 310 #3 is 80 kW×(4/16)=20 kW, and the working individual power POB4 of power supply unit 310 #4 is 80 kW×(3/16)=15 kW. In this case, POBn ≤ SOPn holds for power supply units 310 #2 to 310 #4; however, for power supply units 310 #1, although the possible individual power SOP1 is 20 kW, the working individual power POB1 is 25 kW. As a result, POBn ≤ SOPn does not hold at the time of charging, and the rating is exceeded.

(Power Control Method According to Exemplary Embodiment)

As described above, if there is a power deviation, a problem can occur, for example, the power supply system abnormality stops due to an incident in which the rating is exceeded in a part of power supply units even under the same condition. To address this issue, in the present exemplary embodiment, the working total power POBall is determined on the basis of the power deviation, and then on the basis of the working individual power POBall, charging and discharging of each power supply unit is controlled. Specifically, a chargeable and dischargeable maximum power is calculated for each power supply unit. With this arrangement, the charging SOPn and the discharging SOPn of each power supply unit are calculated. In addition, a measurement is performed at an appropriate time to detect whether there is a power deviation occurring. Specifically, a voltage and a current are continuously measured at an appropriate time to measure POBn/SOPn. Here, as described above, the SOPn is a possible individual power of power supply unit n, and the POBn is a working individual power of power supply unit n.

In the above-described manner, the power supply system calculates the total SOP (possible total power SOPall) from the SOPn, the POBn, and the power deviation information measured at an appropriate time, and the power supply system communicates the calculated total SOP to power conditioner 140. In the present exemplary embodiment, following Equation 2 is calculated to obtain the total SOP.

$$\text{Total } SOP =$$
$$\Sigma(\text{all power supply units except power supply unit}$$
$$\text{with } SOP = 0)(SOPm \times DOBn) =$$
$$SOPm \times \Sigma DOBn = SOPm \times \Sigma(POBn/POBm) =$$
$$SOPm \times \Sigma(POBn)/POBm = SOPm \times (\text{total } POB)/POBm$$

Equation 2

In above Equation 2, DOBn represents a normalized power deviation ratio. DOBn represents the ratio of the electric power of each of the power supply units and is normalized such that the ratio of power supply unit #m with which the above POBn/SOPn is largest is 1. The numeral n for the power supply unit with which the POBn/SOPn is largest is substituted by m.

Note that, as described above, power supply unit #n is supposed to be separated from power conditioner 140 at the time when the SOPn becomes 0. If power supply unit #n is not separated, the total SOP needs to be set to 0.

Figure 5:
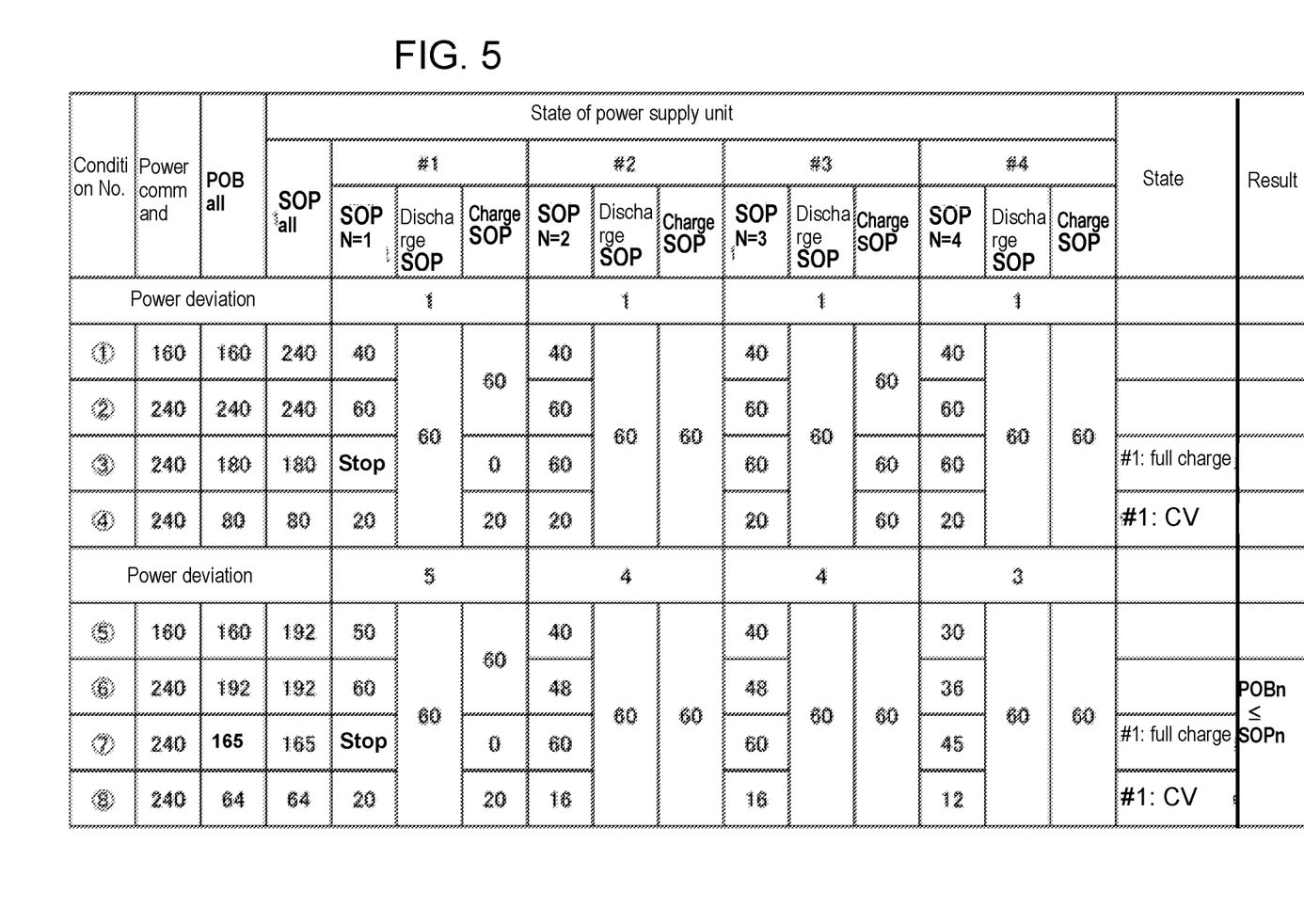
FIG. 5 is a table showing conditions of each battery module of FIG. 1 at a time of power control of each power supply unit.

Power conditioner 140 follows the power command and suppresses electric power such that the charging and discharging power is kept not greater than the total SOP. With this configuration, in a situation in which there is a power deviation occurring, even when a certain power supply unit stops or the SOPn becomes 0, an appropriate electric power suppression can be performed. Further, even when the SOPn of a certain power supply unit decreases, it is possible to keep the electric power of the certain power supply unit not greater than the SOPn. In other words, it is possible to maintain the condition of POBn≤SOPn. As a result, even in a situation in which there is a power deviation occurring, the system does not stop, and an operation of charging and discharging can be continued. Here, a description is given, with reference to FIG. 5, on an example in which charging and discharging control is performed, in the conditions corresponding to FIG. 4, by a power control method according to the present exemplary embodiment. With reference to FIG. 5, the power command, the discharging SOP, and the charging SOP of condition numbers 1 to 8 are made to be identical to the examples represented by condition numbers 1 to 8 of FIG. 4.

(Exemplary Embodiment when there is No Power Deviation)

Also in FIG. 5, the examples represented by condition numbers 1 to 4 show the case in which there is no power deviation occurring among power supply units 10 #1 to 10 #4 as is the case with condition numbers 1 to 4 of FIG. 4 and in which the discharging SOP and the charging SOP of power supply units 10 are each 1:1:1:1.

First, in the case of condition number 1, regarding the possible individual power SOP of each of power supply units 10 #1 to 10 #4, the charging SOP and the discharging SOP are both 60 kW as is the case with condition number 1 of FIG. 4, and the total POB (working total power POBall) is 160 kW. Here, with respect to each of power supply units 10 #1 to 10 #4, power deviation ratio dob_n is calculated. Note that power deviation ratio dob_n is not normalized as the DOBn, and satisfies Σdob_n=1. Regarding power supply unit 10 #1, dob_1=POB1/(total POB)=40 kW/(40+40+40+40) kW=0.25, regarding power supply unit 10 #2, dob_2=POB2/(total POB)=40 kW/(40+40+40+40) kW=0.25, regarding power supply unit 10 #3, dob_3=POB3/(total POB)=40 kW/(40+40+40+40) kW=0.25, and regarding power supply unit 10 #4, dob_4=POB4/(total POB)=40 kW/(40+40+40+40) kW=0.25.

Therefore, power deviation ratios dob_n for power supply units 10 #1 to 10 #4 are the same, and power supply unit 10 having maximum power deviation ratio dob_n is supposed here to be power supply unit 10 #1 (m=1). Thus, when the total SOP (possible total power SOPall) is calculated according to Equation 2, total SOP=SOPm×(total POB)/POBm=SOP1×(total POB)/POB1=60 kW×160 kW/40 kW=240 kW. Further, regarding the working individual power of each power supply unit 10, the working individual power POB1 of power supply unit 10 #1 is 160 kW×dob_1=40 kW, the working individual power POB2 of power supply unit 10 #2 is 160 kW×dob_2=40 kW, the working individual power POB3 of power supply unit 10 #3 is 160 kW×dob_3=40 kW, and the working individual power POB4 of power supply unit 10 #4 is 160 kW×dob_4=40 kW. Here, since the possible individual power SOP1 to SOP4 of power supply units 10 are each 60 kW for both of the discharging SOP and the charging SOP as described above, the working individual power of 40 kW can be dealt with, and POBn≤SOPn thus holds. As a result, the result is the same as in the case of condition number 1 of FIG. 4.

Similarly, in the case of condition number 2, the possible total power SOPall is 60 kW×4=240 kW for both of discharging and charging, and the total POB is 240 kW as is the case with condition number 1. Further, power deviation ratios dob_n for power supply units 10 #1 to 10 #4 are the same, and power supply unit 10 having maximum power deviation ratio dob_n is also supposed here to be power supply unit 10 #1 (m=1). Thus, the total SOP (possible total power SOPall) is calculated according to Equation 2, as total SOP=SOPm×(total POB)/POBm=SOP1×(total POB)/POB1=60 kW×240 kW/60 kW=240 kW. Further, regarding the working individual power of each power supply unit 10, the working individual power POB1 of power supply unit 10 #1 is 240 kW×dob_1=60 kW, the working individual power POB2 of power supply unit 10 #2 is 240 kW×dob_2=60 kW, the working individual power POB3 of power supply unit 10 #3 is 240 kW×dob_3=60 kW, and the working individual power POB4 of power supply unit 10 #4 is 240 kW×dob_4=60 kW. Here, since the possible individual power SOP1 to SOP4 of power supply units 10 are each 60 kW for both of the discharging SOP and the charging SOP as described above, the working individual power of 60 kW can be dealt with, and POBn≤SOPn thus holds, resulting in the same situation as in the case of condition number 2 of FIG. 4 as a result.

On the other hand, in the case of condition number 3, the total POB is 180 kW, and the possible individual power SOP of power supply units 10 #2 to 10 #4 are each 60 kW for both of the charging SOP and the discharging SOP as is the case with condition numbers 1 and 2. Further, since power supply unit 10 #1 is fully charged, the discharging SOP is 60 kW, and the charging SOP is 0. Therefore, power supply unit 10 #1 can be discharged but is separated from power conditioner 140 at the time of charging. Note that power deviation ratios dob_n for power supply units 10 #2 to 10 #4 are the same, and power supply unit 10 having maximum power deviation ratio dob_n is supposed here to be power supply unit 10 #2 (m=2). In this condition, the possible total power SOPall at the time of charging is calculated according to Equation 2, as total SOP=SOPm×(total POB)/POBm=SOP2×(total POB)/POB2=60 kW×180 kW/60 kW=180 kW. Further, regarding the working individual power of each power supply unit 10, power supply unit 10 #1 is separated from power conditioner 140 and is thus not taken into account, the working individual power POB2 of power supply unit 10 #2 is 180 kW×dob_2=60 kW, the working individual power POB3 of power supply unit 10 #3 is 180 kW×dob_3=60 kW, and the working individual power POB4 of power supply unit 10 #4 is 180 kW×dob_4=60 kW. Any of the working individual power POB2 to POB 4 can be dealt with by 60 kW of the charging SOP, and POBn≤SOPn thus holds, resulting in the same situation as in the case of condition number 3 of FIG. 4 as a result.

Further, in the case of condition number 4, the total POB is 80 kW, and the possible individual power SOP of each of power supply units 10 #2 to 10 #4 is 60 kW for both of the charging SOP and the discharging SOP as is the case with condition numbers 1 to 3; however, since power supply unit 10 #1 is being charged by constant voltage charging, the discharging SOP is 60 kW, and the charging SOP is 20 kW. Note that, regarding power supply units 10 #1 to 10 #4, since power deviation ratios dob_n at the time of charging are the same, and power supply unit 10 having maximum power deviation ratio dob_n is also supposed here to be power supply unit 10 #1 (m=1). In this condition, the possible total power SOPall is calculated according to Equation 2, as total SOP=SOPm×(total POB)/POBm=SOP1×(total POB)/POB1=20 kW×80 kW/20 kW=80 kW. Further, regarding the working individual power of each power supply unit 10, the working individual power POB1 of power supply unit 10 #1 is 80 kW×dob_1=20 kW, the working individual power POB2 of power supply unit 10 #2 is 80 kW×dob_2=20 kW, the working individual power POB3 of power supply unit 10 #3 is 80 kW×dob_3=20 kW, and the working individual power POB4 of power supply unit 10 #4 is 80 kW×dob_4=20 kW. Any of the working individual power can be dealt with by 20 kW and 60 kW of the charging SOP1 to SOP4, and POBn≤SOPn thus holds, resulting in the same situation as in the case of condition number 4 of FIG. 4 as a result.

(Exemplary Embodiment: When There is Power Deviation)

As described above, by the power control method according to the exemplary embodiment, also in the condition in which there is no power deviation among power supply units 10, charging and discharging power control can be appropriately performed in any of the cases of condition numbers 1 to 4. Next, a discussion is made on condition numbers 5 to 8 in the case in which the power deviation of power supply units 10 #1 to 10 #4 is a current ratio of 5:4:4:3 as is the case with FIG. 5. Note that the power command, the total POB, the discharging SOP, and the charging SOP are made to correspond to one another between condition numbers 5 to 8 and condition numbers 1 to 4.

First, in the case of condition number 5, regarding the possible individual power SOP of each of power supply units 10 #1 to 10 #4, the charging SOP and the discharging SOP are both 60 kW as is the case with condition number 1, and the total POB is 160 kW. Further, power deviation ratio dob_n calculated with respect to each of power supply units 10 #1 to 10 #4 is as follows: regarding power supply unit 10 #1, dob_1=POB1/(total POB)=50 kW/160 kW=0.3125; regarding power supply unit 10 #2, dob_22=POB2/(total POB)=40 kW/160 kW=0.25; regarding power supply unit 10 #3, dob_3=POB3/(total POB)=40 kW/160 kW=0.25; and regarding power supply unit 10 #4, dob_4=POB4/(total POB)=30 kW/160 kW=0.1875. Therefore, power supply unit 10 having maximum power deviation ratio dob_n is power supply unit 10 #1 (m=1). Thus, when the total SOP (possible total power SOPall) is calculated according to Equation 2, total SOP=SOPm×(total POB)/POBm=SOP1×(total POB)/POB1=60 kW×160 kW/50 kW=192 kW. Further, regarding the working individual power of each power supply unit 10, the working individual power POB1 of power supply unit 10 #1 is 160 kW×dob_1=50 kW, the working individual power POB2 of power supply unit 10 #2 is 160 kW×dob_2=40 kW, the working individual power POB3 of power supply unit 10 #3 is 160 kW×dob_3=40 kW, and the working individual power POB4 of power supply unit 10 #4 is 160 kW×dob_4=40 kW. Here, since the possible individual power SOP1 to SOP4 of power supply units 10 are each 60 kW for both of the discharging SOP and the charging SOP as described above, each working individual power POBn can be dealt with, and POBn≤SOPn thus holds.

Next, in the case of condition number 6, regarding the possible individual power SOP of each of power supply units 10 #1 to 10 #4, the charging and the discharging SOP are both 60 kW as is the case with condition number 2, and the total POB is 192 kW. Further, power deviation ratio dob_n calculated with respect to each of power supply units 10 #1 to 10 #4 is as follows: regarding power supply unit 10 #1, dob_1=POB1/(total POB)=60 kW/192 kW=0.3125; regarding power supply unit 10 #2, dob_2=POB2/(total POB)=48 kW/192 kW=0.25; regarding power supply unit 10 #3, dob_3=POB3/(total POB)=48 kW/192 kW=0.25; and regarding power supply unit 10 #4, dob_4=POB4/(total POB)=36 kW/192 kW=0.1875. Therefore, power supply unit 10 having maximum power deviation ratio dob_n is power supply unit 10 #1 (m=1). Thus, when the total SOP is calculated according to Equation 2, total SOP=SOPm×(total POB)/POBm=SOP1×(total POB)/POB1=60 kW×192 kW/60 kW=192 kW. Further, regarding the working individual power of each power supply unit 10, the working individual power POB1 of power supply unit 10 #1 is 192 kW×dob_1=60 kW, the working individual power POB2 of power supply unit 10 #2 is 192 kW×dob_2=48 kW, the working individual power POB3 of power supply unit 10 #3 is 192 kW×dob_3=48 kW, and the working individual power POB4 of power supply unit 10 #4 is 192 kW×dob_4=36 kW. Here, since the possible individual power SOP1 to SOP4 of power supply units 10 are each 60 kW for both of the discharging SOP and the charging SOP as described above, each working individual power POBn can be dealt with, and POBn≤SOPn thus holds. Compared with the same condition in FIG. 4, the working individual power of power supply unit 10 #1 is lowered from 75 kW to 60 kW, and it is thus possible to prevent the possible individual power, that is, a maximum rated power from being exceeded, whereby the power supply system can stably operate.

Further, in the case of condition number 7, regarding the possible individual power SOP of each of power supply units 10 #2 to 10 #4, the charging SOP and the discharging SOP are both 60 kW as is the case with condition number 3; however, power supply unit 10 #1 is fully charged, whereby the discharging SOP is 60 kW, and the charging SOP is 0. Therefore, charging is possible, but power supply unit 10 #1 is separated from the power supply system at the time of charging. In addition, the total POB is 165 kW. Here, power deviation ratio dob_n, at the time of charging, calculated with respect to each of power supply units 10 #2 to 10 #4 is as follows: regarding power supply unit 10 #2, dob_2=POB2/(total POB)=60 kW/165 kW=0.3637; regarding power supply unit 10 #3, dob_3=POB3/(total POB)=60 kW/165 kW=0.3637; and regarding power supply unit 10 #4, dob_4=POB4/(total POB)=45 kW/165 kW=0.2728. Therefore, power supply unit 10 having maximum power deviation ratio dob_n is power supply units 10 #2 and 10 #3. Here, when the total SOP at the time of charging is calculated according to Equation 2 assuming that power supply unit 10 having the maximum power deviation is power supply unit 10 #2 (m=2), total SOP=SOPm×(total POB)/POBm=SOP2×(total POB)/POB2=60 kW×165 kW/60 kW=165 kW. Further, regarding the working individual power, at the time of charging, of each power supply unit 10, the working individual power POB2 of power supply unit 10 #2 is 165 kW×dob_2=60 kW, the working individual power POB3 of power supply unit 10 #3 is 165 kW×dob_3=60 kW, and the working individual power POB4 of power supply unit 10 #4 is 165 kW×dob_4=45 kW. Here, since the possible individual power SOP2 to SOP4 of each of power supply units 10 is 60 kW for both of the discharging SOP and the charging SOP as described above, each working individual power POBn can be dealt with, and POBn≤SOPn thus holds. Compared with the same condition in FIG. 4, the working individual power of each of power supply units 10 #2 and 10 #3 is lowered from 65 kW to 60 kW, and it is thus possible to prevent the maximum rated power from being exceeded, whereby the power supply system can stably operate.

Further, in the case of condition number 8, as is the case with condition number 4, the possible individual power SOP of each of power supply units 10 #2 to 10 #4 is 60 kW for both of the charging SOP and the discharging SOP, power supply unit 10 #1 is being charged by constant voltage charging, the discharging SOP is 60 kW, and the charging SOP is 20 kW. In addition, the total POB is 64 kW. Here, power deviation ratio dob_n, at the time of charging, calculated with respect to each of power supply units 10 #1 to 10 #4 is as follows: regarding power supply unit 10 #1, dob_1=POB1/(total POB)=20 kW/64 kW=0.3125; regarding power supply unit 10 #2, dob_2=POB2/(total POB)=16 kW/64 kW=0.25; regarding power supply unit 10 #3, dob_3=POB3/(total POB)=16 kW/64 kW=0.25; and regarding power supply unit 10 #4, dob_4=POB4/(total POB)=12 kW/64 kW=0.1875. Therefore, power supply unit 10 having maximum power deviation ratio dob_n is power supply unit 10 #1. Thus, when the total SOP at the time of charging is calculated by Equation 2 where m=1, the calculation result is total SOP=SOPm×(total POB)/POBm=SOP1×(total POB)/POB1=20 kW×64 kW/20 kW=64 kW. Further, regarding the working individual power, at the time of charging, of each power supply unit 10, the working individual power POB1 of power supply unit 10 #1 is 64 kW×dob_1=20 kW, the working individual power POB2 of power supply unit 10 #2 is 64 kW×dob_2=16 kW, the working individual power POB3 of power supply unit 10 #3 is 64 kW×dob_3=16 kW, and the working individual power POB4 of power supply unit 10 #4 is 64 kW×dob_4=12 kW. Thus, the possible individual power SOP1 to SOP4 of power supply units 10 can respectively deal with working individual power POB1 to POB4, and POBn≤SOPn thus holds. Compared with the same condition in FIG. 4, the working individual power of power supply unit 10 #1 is lowered from 25 kW to 20 kW, and it is thus possible to prevent the maximum rated power from being exceeded, whereby the power supply system can stably operate.

By using the above method, it is possible to perform charging and discharging control depending on the power deviation, and an unintended system failure can thus be avoided.

Note that the power deviation can be detected at a constant cycle, and the working individual power can be updated on the basis of the detected power deviation. This arrangement enables appropriate adjustment of the charging and discharging power, coping with the battery condition temporally varying from hour to hour. The power deviation is preferably detected on the controller on the unit side and sent out to master controller 120. However, the present invention does not limit the timing of detection of the power deviation to a cyclic detection, and the detection can be performed at an arbitrary timing. For example, the detection timing may be varied, for example, the detection may be performed at the time when an issue implying change in the power deviation occurs, or the detection may be performed at long intervals when the power deviation does not often change or at short intervals when the power deviation often changes. Further, the method for measuring the power deviation and the like is not limited to the measurement of a voltage or a current, and other methods can be used appropriately.

Figure 6:
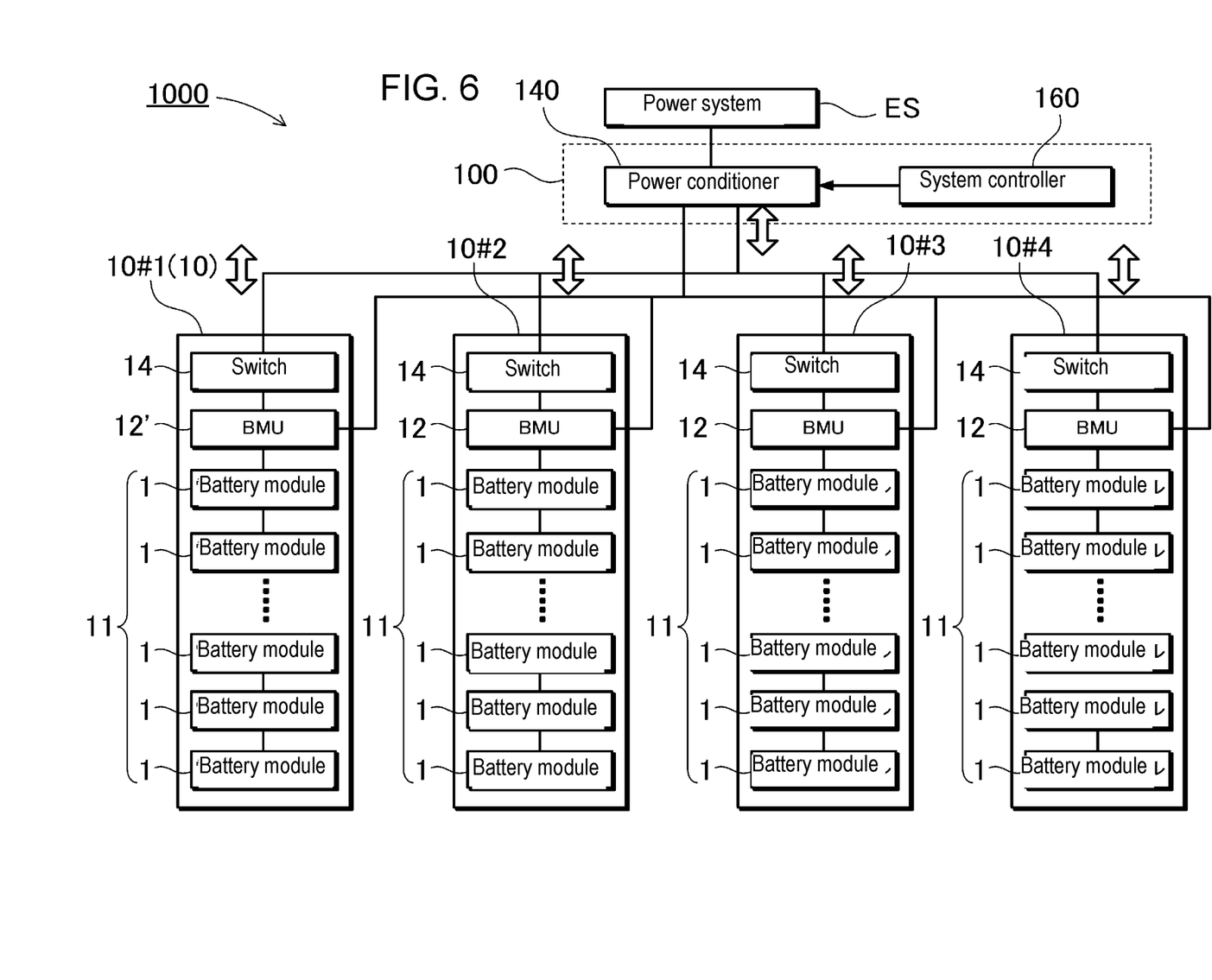
FIG. 6 is a block diagram showing a power supply system according to a modified example.

Further, in the example of FIG. 1, master controller 120 calculates the power deviation and communicates the power deviation to power conditioner 140; however, other than this configuration, the power deviation may be calculated by the system controller or the power conditioner. Alternatively, the function of calculating the power deviation may be provided on the unit controller side. For example, in a power supply system according to a modified example shown FIG. 6, unit controller 12' of power supply unit 10 #1 includes the function of calculating the power deviation and plays a role of the master controller. In this case, the master controller does not need to be provided.

INDUSTRIAL APPLICABILITY

A power supply system and a power conditioner according to the present invention can be suitably used as a large-scale power storage device used in a power plant or the like and as a controller of the power storage device.

REFERENCE MARKS IN THE DRAWINGS 1000 power supply system
1 battery module
10, 10 #1 to 10 #4, 210, 310, 310 #1 to 310 #4 power supply unit
11, 211, 311 battery aggregation
12, 12', 212, 312 unit controller (BMU)
14, 214, 314 switch
100 control system 120 master controller (M-BMU)
140, 240, 340 power conditioner
160 system controller
ES power system

The invention claimed is:

1. A power supply system comprising:
a plurality of power supply units, and;
a control system to which the power supply units are parallel connected,
wherein each of the power supply units includes:
   a battery aggregation including a plurality of secondary battery cells serial and parallel connected;
   a unit controller that acquires battery information about electric power at which the battery aggregation is chargeable and dischargeable and that outputs the battery information to the control system; and
   a switch provided in each of the power supply units and configured to switch connection and disconnection between the power supply unit and the control system,
wherein the control system includes:
   a power conditioner that is parallel connected to the plurality of power supply units and is connected to an external power system, and receives electric power from the power system and charges the plurality of power supply units with the received electric power, and receives electric power from the plurality of power supply units and discharges the received electric power to the power system;
   a master controller that collects the battery information output from the unit controller of each of the power supply units; and
   a system controller that communicates to the power conditioner, electric power required to the power supply system as a power command, and
wherein, in a case where the power conditioner determines, according to the power command from the system controller, a working total power POBall, which is a summation of electric power at which each of the power supply units is charged and discharged,
the power conditioner determines possible total power SOPall at which all the power supply units are chargeable and dischargeable to be in a range that possible individual power SOP of each of the power supply units is not exceeded,
the possible total power SOPall being determined from the possible individual power SOP, of each of the power supply units, determined based on the battery information detected by each of the unit controllers, collected by the master controller from each of the unit controllers,
the power conditioner causes charging and discharging of each of the power supply units within a working individual power POB of each of the power supply units,
wherein
each of the power supply units connected in parallel is connected via the corresponding switch to the control system including the power conditioner, such that the power supply units are directly connected in parallel without the control system therebetween where each switch establishes connection between the corresponding power supply unit and the control system,
the possible total power SOPall at which all the power supply units are chargeable and dischargeable is determined based on the possible individual power SOP of each of the power supply units and a power deviation indicating a difference of a charging and discharging power between the power supply units, and
the working individual power POB for charging and discharging of each of the power supply units is determined so as not to exceed the possible individual power SOP of each of the power supply units.

2. The power supply system according to claim 1, wherein the master controller detects the power deviation between the power supply units and sends out the power deviation to the power conditioner.

3. The power supply system according to claim 2, wherein the master controller detects the power deviation between the power supply units at a predetermined cycle or at a time when a change in electric power is detected, and constantly suppresses the working individual power POB equal to or smaller than individual maximum charging and discharging power, based on the detected power deviation.

4. The power supply system according to claim 1, wherein each of the unit controllers determines the possible individual power SOP, based on the battery information of the battery aggregation connected to each of the unit controllers.

5. The power supply system according to claim 1, wherein the master controller determines the working individual power POB, based on the possible individual power SOP sent out from each of the unit controllers connected to the master controller.

6. The power supply system according to claim 1, wherein the master controller calculates power deviation ratio DOBn of each of the power supply units, assuming that a ratio for the power supply unit #m, which is one of power supply units #1 to #n and with which (n-th working individual power POBn)/(n-th possible individual power SOPn) is largest, is 1, where 1≤m≤n.

7. The power supply system according to claim 6, wherein the master controller determines the possible total power SOPall by a following equation:
possible total power SOPall=SOPm×(working total power)/(m-th working individual power POBm), wherein power deviation ratio DOBn of each of the power supply units is calculated, assuming that the ratio for power supply unit #m with which above POBn/SOPn is largest is 1, and n for the power supply unit with which the POBn/SOPn is largest is substituted by m.

8. The power supply system according to claim 1, wherein the possible total power SOPall is calculated by a following equation:

possible total power SOPall=Σ(all power supply
units except power supply unit with SOP=0)
(SOP$m$×DOB$n$)=SOP$m$×ΣDOB$n$=SOP$m$×Σ
(POB$n$/POB$m$)=SOP$m$×Σ(POB$n$)/
POB$m$=SOP$m$×(total POB)/POB$m$, wherein
SOP represents a possible individual power for each of the power supply units,
DOBn represents a ratio of electric power of each of the power supply units, said ratio being normalized such that the ratio of the power supply unit #m is 1, and
the numeral n for the power supply unit #m is substituted by m.

9. A control system for a power supply system in which a plurality of power supply units are parallel connected and in which charging and discharging of each of the power supply units is controlled, the control system comprising:
   a power conditioner that is parallel connected to the plurality of power supply units and is connected to an external power system, and receives electric power from the power system and charges the plurality of power supply units with the received electric power, and receives electric power from the plurality of power supply units and discharges the received electric power to the power system;

a master controller that collects battery information having been output from each of the power supply units; and a system controller that communicates to the power conditioner electric power required to the power supply system as a power command, wherein the power conditioner causes charging and discharging of each of the power supply units within working individual power POB, based on possible total power SOPall at which all the power supply units are chargeable and dischargeable, the possible total power SOPall being determined from a possible individual power SOP, of each of the power supply units, determined based on the battery information detected on each of the power supply units, and the working individual power POB being determined based on a power deviation indicating a difference of charging and discharging power between the power supply units, wherein a switch is provided in each of the power supply units and configured to switch connection and disconnection between the power supply unit and the control system, each of the power supply units connected in parallel is connected via the corresponding switch to the control system including the power conditioner, such that the power supply units are directly connected in parallel without the control system therebetween where each switch establishes connection between the corresponding power supply unit and the control system, the possible total power SOPall at which all the power supply units are chargeable and dischargeable is determined based on the possible individual power SOP of each of the power supply units and the power deviation, and the working individual power POB for charging and discharging of each of the power supply units is determined so as not to exceed the possible individual power SOP of each of the power supply units.

10. A power control method in a power supply system including a plurality of power supply units and a control system to which the plurality of power supply units are parallel connected, the power control method comprising:

receiving, by the control system, electric power required to the power supply system as a power command;

acquiring battery information about electric power at which a battery aggregation included in each of the power supply units is chargeable and dischargeable, and outputting the acquired battery information to the control system, the battery aggregation including a plurality of secondary battery cells serial or parallel connected;

determining, based on the battery information of the power supply units:

possible individual power SOP indicating electric power at which each of the power supply units is chargeable and dischargeable;

possible total power SOPall indicating electric power at which all the power supply units are chargeable and dischargeable; and a power deviation indicating a difference of a charging and discharging power between the power supply units, and determining, based on the determined possible individual power SOP, the determined possible total power SOPall, the determined power deviation, and the power command, working individual power POB in a range that the working individual power POB does not exceed the possible individual power SOP of each of the power supply units, the working individual power POB being electric power at which each power supply unit is charged and discharged, wherein a switch is provided in each of the power supply units and configured to switch connection and disconnection between the power supply unit and the control system, each of the power supply units connected in parallel is connected via the corresponding switch to the control system including the power conditioner, such that the power supply units are directly connected in parallel without the control system therebetween where each switch establishes connection between the corresponding power supply unit and the control system, the possible total power SOPall at which all the power supply units are chargeable and dischargeable is determined based on the possible individual power SOP of each of the power supply units and the power deviation, and the working individual power POB for charging and discharging of each of the power supply units is determined so as not to exceed the possible individual power SOP of each of the power supply units.

* * * * *